United States Patent [19]

Sharrow

[11] Patent Number: 5,076,819

[45] Date of Patent: Dec. 31, 1991

[54] DYNAMIC GAS-LIQUID CONTACT APPARATUS AND METHOD

[76] Inventor: Phillip G. Sharrow, 975 East Ave., Suite 136, Chico, Calif. 95926

[21] Appl. No.: 509,562

[22] Filed: Apr. 13, 1990

[51] Int. Cl.$^5$ .............................................. B01D 47/02
[52] U.S. Cl. .......................................... 55/86; 55/95; 55/91; 55/230; 55/247; 261/91
[58] Field of Search ................ 53/86, 89, 90, 91, 92, 53/95, 223, 230, 244, 247; 261/91

[56] References Cited

U.S. PATENT DOCUMENTS

| | | | |
|---|---|---|---|
| 1,821,886 | 9/1931 | Fleisher | 55/230 X |
| 1,853,853 | 4/1932 | Fleisher | 261/91 |
| 2,314,986 | 3/1943 | Johnson | 55/247 X |
| 2,899,012 | 8/1959 | Davis | 55/223 X |
| 3,235,235 | 2/1966 | Umbricht et al. | 55/230 X |
| 3,960.524 | 6/1976 | Cumpston | 55/86 |
| 4,005,999 | 2/1977 | Cailson | 55/244 X |

FOREIGN PATENT DOCUMENTS 0847735  7/1970  Canada .................................. 261/91

*Primary Examiner*—Charles Hart
*Attorney, Agent, or Firm*—Phillips, Moore, Lempio & Finley

[57] ABSTRACT

An improved gas-liquid contact apparatus comprises a housing having a reservoir for retaining a liquid therein. A combined mixing and separation system functions to draw a gas over the surface of the liquid to form a mixture and then scrubs and separates pre-selected elements from the mixture. The separated elements are recycled, shiphoned-off for use as an end product or drained back into the reservoir. The apparatus is particularly useful for removing pre-selected elements from contamined air or from exhaust gases discharged from an internal combustion engine. In one described embodiment, the apparatus is vertically disposed and the mixing and separation system includes a rotor having a conically shaped lower end emersed in the liquid to draw-up and spray the liquid into the gas stream. A blower creates a differential pressure across the system and provides the motive force for the scrubbing and separation functions. In a second described embodiment, the apparatus is horizontally disposed and the mixing and separation system comprises a plurality of baffles and deflectors that cooperate with at least one combined blower and scrubber to effect the mixing, scrubbing and separation functions. In both embodiments, the apparatus can be staged in multiple sections for more effective activity.

41 Claims, 6 Drawing Sheets

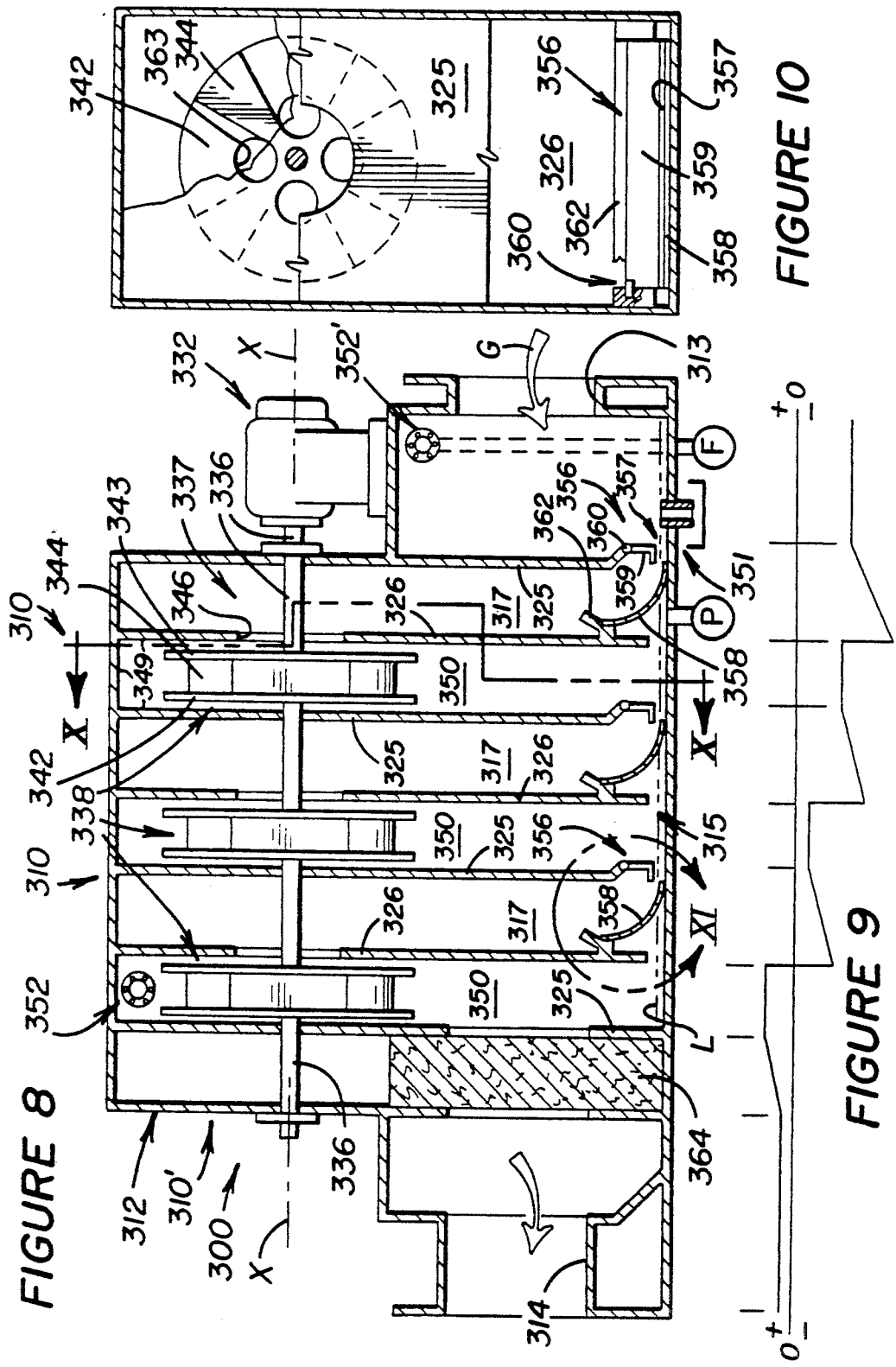

DYNAMIC GAS-LIQUID CONTACT APPARATUS AND METHOD

TECHNICAL FIELD

This invention relates generally to a gas-liquid contact apparatus and method and more particularly to the separation of pre-selected elements from a gas-liquid mixture by moving a gas stream over a liquid body to form the mixture and thereafter dynamically scrubbing an separating the elements from the mixture.

BACKGROUND OF THE INVENTION

It is common practice to process contaminated gases, such as contaminated ambient air or exhaust or flue gases, by passing the gases through a scrubbing tower. Conventional scrubbing towers usually contain water or other chemically reactive solutions that react with or absorb the undesirable elements in a gas stream passed through the scrubbing tower. For example, the removal of oxides of sulfur, during the burning of coal in utility plants and the like, is normally accomplished by utilizing chemical solutions containing alkaline compounds that react with the oxides of sulfur to form soluble sulfites and sulfates.

Relatively complex baffle systems within the scrubbing zone of the tower promote liquid-gas contact. Alternatively, contact elements in the form of stationery or floating beds have been used whereby the cleaning solution coats the elements and, as the gas passes through the beds, the oxides of sulfur will contact the scrubbing solution on the contact elements. Apparatus and methods of the above types require high levels of energy and are often-times cost prohibitive.

Air pollution control systems are also required for all contemporary refuse-to energy plants for the purpose of cleaning flue gases. Present day environmental regulations require scrubbers and electrostatic precipitators or baghouses. These systems are quite effective in the reduction of acid-gas emissions and particulate levels. The most common scrubber used is the so-called dry scrubber which can be operated with relatively low power requirements.

The dry scrubber, so-called because of its dry reaction product, involves the spraying of a lime slurry into a flue gas stream. Residence time is sufficient for mixing and neutralizing to occur. Contact between the finely dispersed droplets and the flue gas will cause the water to evaporate rapidly. Relatively high acid-gas removal efficiency is achieved and a dry reaction product is obtained. Systems of this type require close attention to the temperature of the entering flue gases which must be maintained sufficiently high to completely evaporate the slurry water. Further, the design of the boiler and heat recovering equipment must be compatible with scrubber requirements at all operating loads.

A typical scrubber-washer system presently used for industrial applications is the so-called Fumatrol system, manufactured by the Pollution Control Division of Savko Plastics of Santa Clara, Calif. The system can be tailored for the treatment of exhaust gases that contain large amounts of $H_2$ or $NO_2$ and exhaust gases of general industrial character (e.g., wet stations). These scrubbing systems find particular application with epitaxial silicone chemical vapor deposition (CVD) reactors, silicone etch and polish stations, associated cleaning operations, precious metal reclaiming, printed circuit board operations, refining operations and wet stations, i.e., wafer fabrication.

This type of scrubber system includes multiple stages wherein the contaminated gases are subjected to intense scrubbing and washing to achieve the desired gas-to-liquid contact. The gases flow downwardly through a plurality of tubes in each stage during which time they are subjected to a fine mist spray to prevent the retention of solid formation on the inner surfaces of the tubes. The gases exit the tubes and pass through a water bath to expose a relatively large gas-plane for water molecules of the bath to contact. The gases then move upwardly for processing through the next adjacent stage The air pollution problem existing in commercial establishments, such a beauty parlors and restaurants, is normally confronted with the use of standard dry filters mounted in air conditioning systems and the like. Beauty parlors, for example, tend to exude various noxious elements, such as acetates, peroxides and sulfides. Dry filters are unable to clean the polluted air to render it non-toxic, odorless and substantially clean.

U.S. Pat. Nos. 3,954,921; 4,156,712; 4,164,399; and 4,818,259 also disclose various conventional scrubber-type systems, adapted for industrial uses of the type described above.

SUMMARY OF THE INVENTION

The present invention provides an improved dynamic gas-liquid contact apparatus and method for efficiently and economically scrubbing and separating pre-selected elements from a gas-liquid mixture. Further, the external power requirements of this invention are substantially less than that required for running conventional scrubbing systems of similar size and capacity. The apparatus and method of this invention are adapted for use in a wide variety of industrial, commercial and domestic applications, such as use in power plants, other industrial facilities, beauty parlors and homes.

In its broadest aspect, the apparatus comprises a stationary housing defining a working chamber therein, having an inlet and an outlet. A reservoir is positioned at a lower end of the chamber for retaining a liquid therein and a mixing and separation means is mounted in the chamber for (1) drawing a gas into the chamber from the inlet; (2) moving the gas over the surface of the liquid to break the surface tension thereof and to simultaneously form a gas-liquid mixture; and (3) scrubbing and separating the pre-selected elements from the mixture.

The separated elements can be recycled, siphoned-off for use as an end product (e.g., fertilizer) or permitted to overflow or drain into the reservoir in wetted form. Multiple stages of the apparatus can be utilized sequentially to insure substantially complete removal of such pre-selected elements from the gas-liquid mixture.

In one embodiment of the invention, the apparatus is vertically disposed and the mixing and separation means comprises a combined blower and scrubber mounted in the housing for rotation about a vertical axis. The blower and scrubber define an inner boundary of the working chamber between its inlet and its outlet and function to engage and lift the liquid vertically to combine it with the gas to form the mixture. The blower and scrubber further function to scrub and centrifugally cast at least substantial quantities of the mixture against impingement surfaces, defining an outer boundary of the working chamber, whereby the pre-selected elements contained in the mixture are separated therefrom.

In another described embodiment, the apparatus is horizontally disposed and baffles and directors are mounted in the chamber of the housing for sequentially guiding and deflecting (1) the gas in the direction of a first path moving over the surface of the liquid; (2) the gas-liquid mixture in the direction of a second path moving generally vertically upwardly from the reservoir; and (3) the mixture in the direction of a third path moving generally vertically downwardly towards the reservoir in at least general parallel relationship relative to the second path. A combined blower and scrubber is mounted in the chamber for rotation about a horizontally disposed axis and is positioned at a transition from the second path to the third path for drawing the gas from the inlet and along the first path to sequentially pump the mixture along the second and third paths and to cooperate with the baffles and directors for at least substantially scrubbing, separating and removing the elements from the mixture. The separated elements can be recycled, siphoned-off for use as an end product or permitted to overflow or drain into the reservoir in wetted form under the influence of centrifugal force and gravity.

The method of this invention parallels the apparatus and comprises the steps of maintaining the surface of a liquid, containing predetermined first elements, at a preselected level in a reservoir, passing a gas, containing predetermined second elements, over the surface of the liquid to break the surface tension thereof and to simultaneously form a gas-liquid mixture and scrubbing and separating pre-selected ones of the first and second elements from the mixture.

BRIEF DESCRIPTION OF THE DRAWINGS

Other objects and advantages of this invention will become apparent from the following description and accompanying drawings wherein:

FIG. 8 is a sectioned side elevational view illustrating a multi-stage and horizontally disposed apparatus and fourth embodiment of this invention;

FIG. 9 is a pressure profile curve representing the pressures prevalent in the working chambers of the FIG. 8 apparatus;

FIG. 10 is a sectional view through the apparatus, taken in the direction of arrows X—X in FIG. 8, with parts broken-away for clarification purposes;

DESCRIPTION OF THE PREFERRED EMBODIMENTS

General Description

Figure 1:
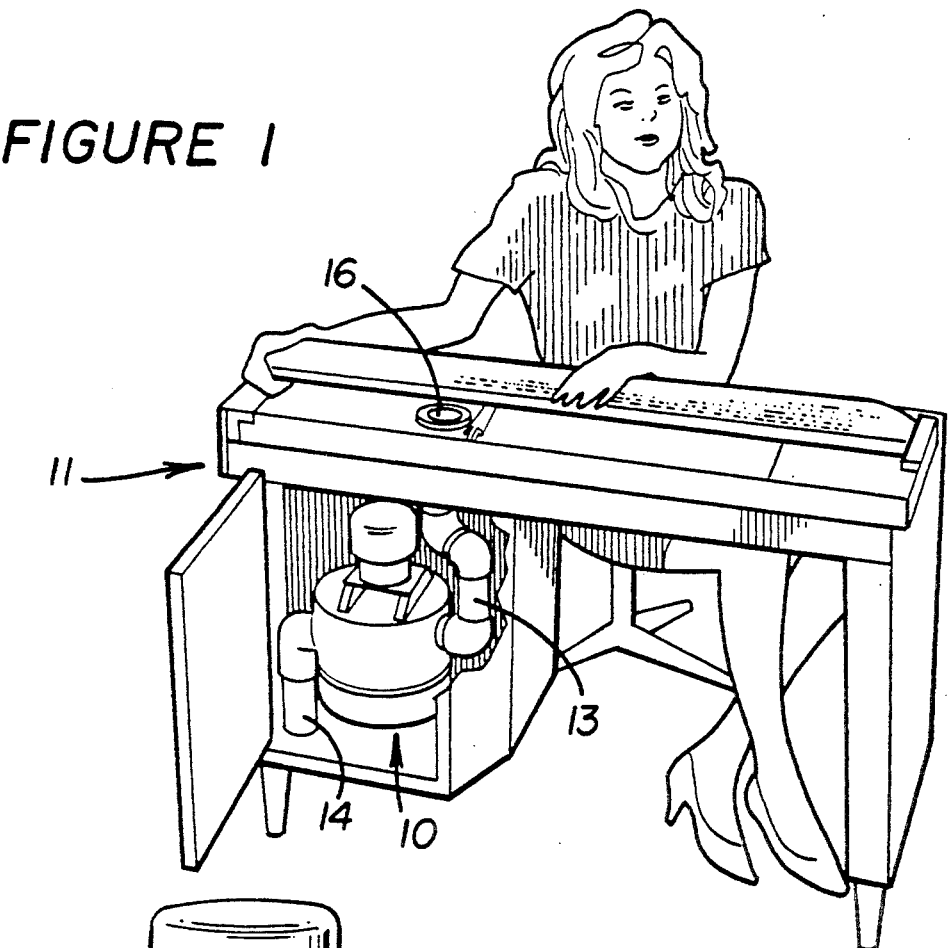
FIG. 1 illustrates a manicurist sitting at a worktable, having a single stage and vertically disposed dynamic gas-liquid contact apparatus embodiment of this invention mounted in a lower cabinet thereof.

The dynamic gas-liquid contact apparatus and method of this invention are adapted for use in a wide variety of industrial, commercial and domestic applications. For example, FIG. 1 illustrates a vertically disposed dynamic gas-liquid contact apparatus 10 mounted in a lower cabinet of a manicurist's worktable 11. The apparatus, shown in detail in FIGS. 2 and 3 and shown schematically in FIG. 4, comprises a housing 12 having an inlet 13 and an outlet 14. A reservoir 15 is positioned at a lower end of the housing to retain a liquid L therein, such as water (FIG. 4). Inlet 13 is suitably connected to an opening 6, exposed at the top of worktable 11, to communicate contaminated ambient air G through a multi-passage working chamber 17 of the apparatus for processing and cleaning purposes.

In particular, the air in beauty parlors is normally laden with noxious elements, such as acetates, peroxides and sulfites. As schematically shown in FIG. 4, these contaminants are removed by a mixing and separation means 18 mounted in working chamber 17 for: (1) drawing the ambient air into chamber 17 from inlet 13; (2) moving the air over the surface of liquid L to break the surface tension thereof and to simultaneously form a gas-liquid mixture; and (3) scrubbing and separating the noxious elements from the air.

The noxious elements are permitted to drain into reservoir 15 in wetted form under the influence of centrifugal force and gravity. The relatively clean air exiting the apparatus from outlet 14, having its outlet (not shown) located beneath worktable 11, is thus recycled into the room. The contaminated liquid can be periodically removed and replaced with clean liquid, e.g., clean water with or without additives, as described hereinafter.

Figure 5:
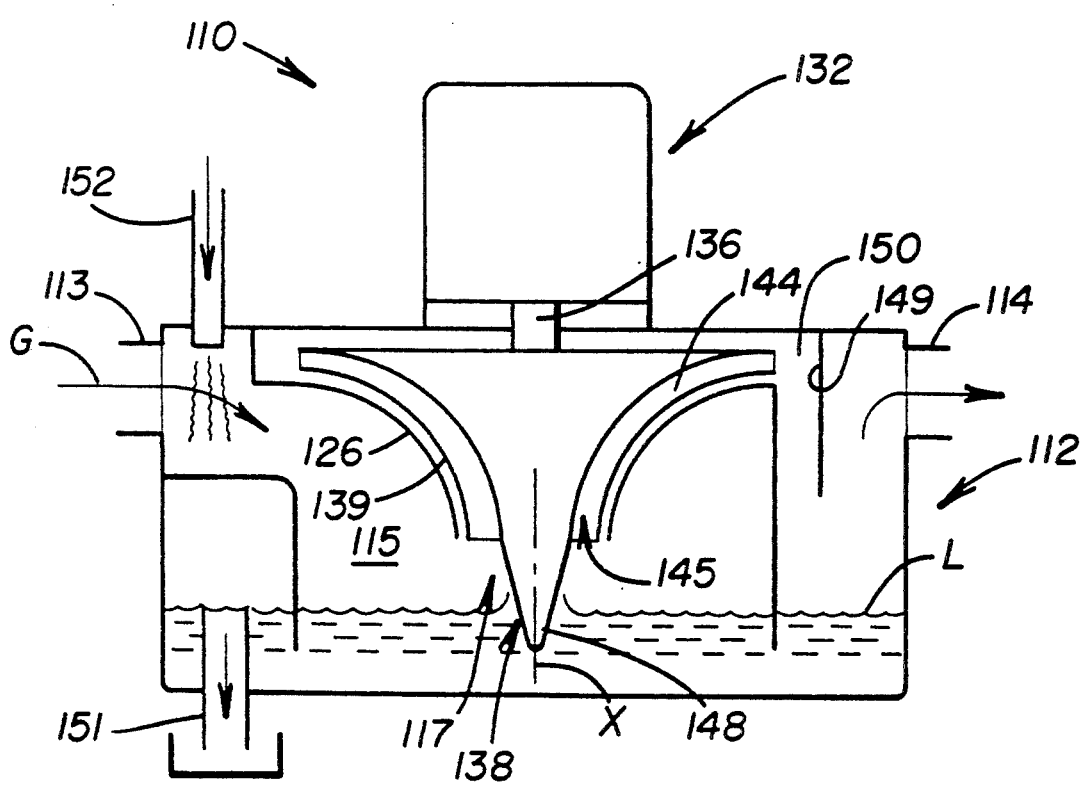
FIG. 5 is a schematic view similar to FIG. 4, but illustrates a second dynamic gas-liquid contact apparatus embodiment of this invention.
Figure 6:
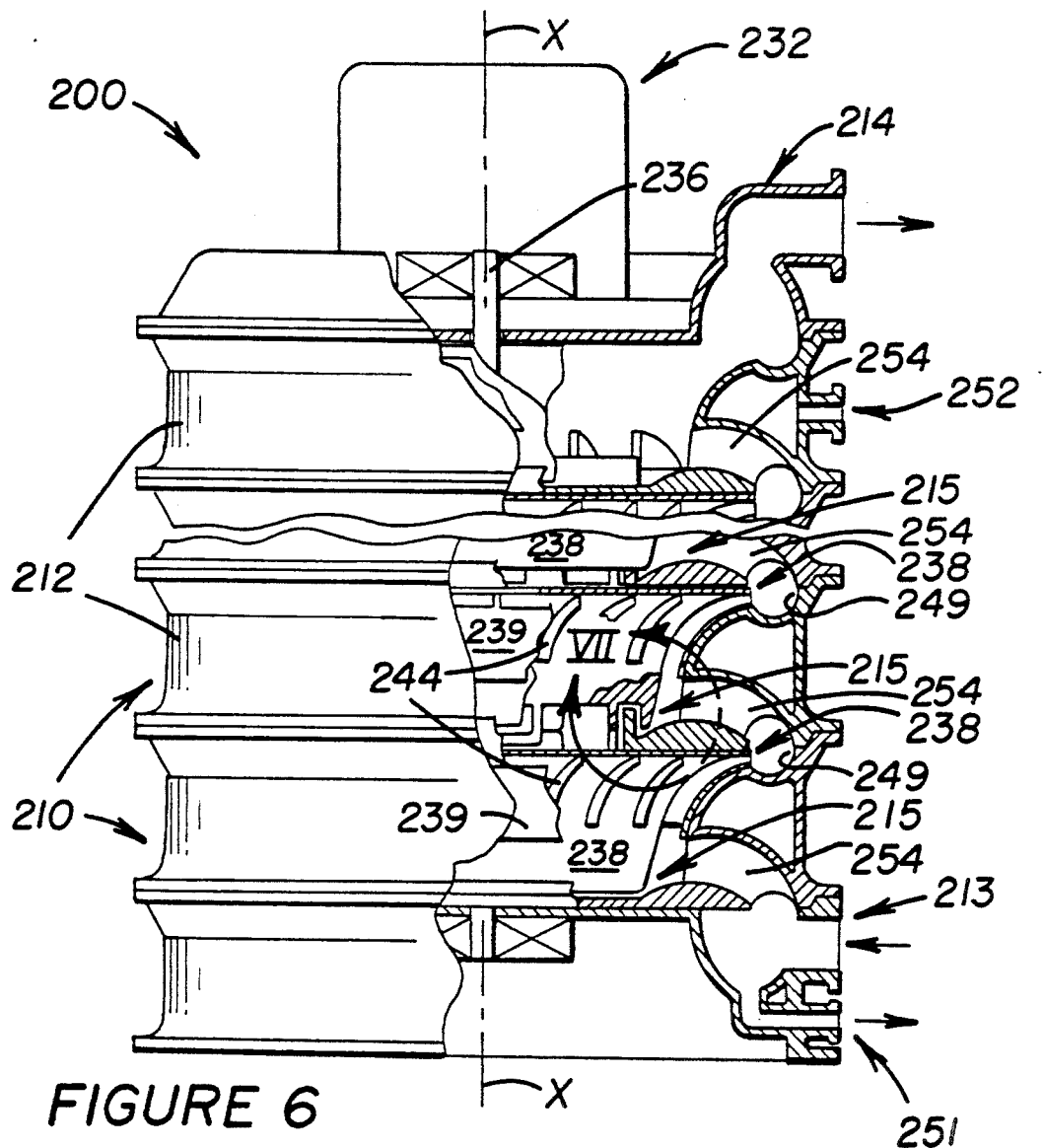
FIG. 6 is a partially sectioned front elevational view illustrating a multi-stage third embodiment of this invention wherein a plurality of single stage apparatus, similar to that shown in FIG. 5, are stacked together in series.

FIG. 6 illustrates a multi-stage embodiment 200 of this invention wherein a plurality of modified dynamic gas-liquid contact apparatus 210 are formed into modular sections and stacked together vertically in series. Each working stage or section 210 generally functions in the manner schematically shown in FIG. 5. In particular, each corresponding section 110 (210 in FIG. 6) draws a gas G into a working chamber 117 from an inlet 113, moves the gas over the surface of a liquid L to break the surface tension thereof and to simultaneously form a gas-liquid mixture, and scrubs and separates pre-selected elements from the mixture. The separated elements can be recycled, siphoned-off for use as an end product, permitted to overflow into a reservoir 215 of a next adjacent lower section or permitted to drain back into a lower common reservoir (not shown) in wetted form under the influence of centrifugal force and gravity. The multiple stages of apparatus 200 will progressively insure at least substantially complete removal of pre-selected elements from the gas-liquid mixture, such as oxides of sulfur.

FIG. 8 illustrates a horizontally disposed multistage embodiment 300 of this invention that functions to draw a gas G therein for processing through a connected series of dynamic gas-liquid contact apparatus 310 suitably mounted on a common housing 312. The gas is drawn into a working chamber 317 of the first stage and is moved over the surface of a liquid L, contained in a common reservoir 315 positioned at lower ends of intercommunicating working chambers 317. The ga functions to break the surface tension of the liquid and a gas-liquid mixture is formed. As described in detail hereinafter, each working stage or section then functions to scrub and separate pre-selected elements from the mixture. The elements can be siphoned-off for use as an end product, recycled, permitted to overflow into an adjacent section or drained back into the reservoir in wetted form under the influence of centrifugal force and gravity.

It should be noted that the last two numerals in the "100" (FIG. 5), "200" (FIGS. 5–7) and "300" (FIGS. 8–12 series of numerals correspond to identical numerals appearing in FIGS. 1–4 to depict constructions and components having similar functions. The basic principles under which the various embodiments described herein function, are substantially identical and shall only be limited by the breath of the claims appended hereto.

DETAILED DESCRIPTION

Figure 2:
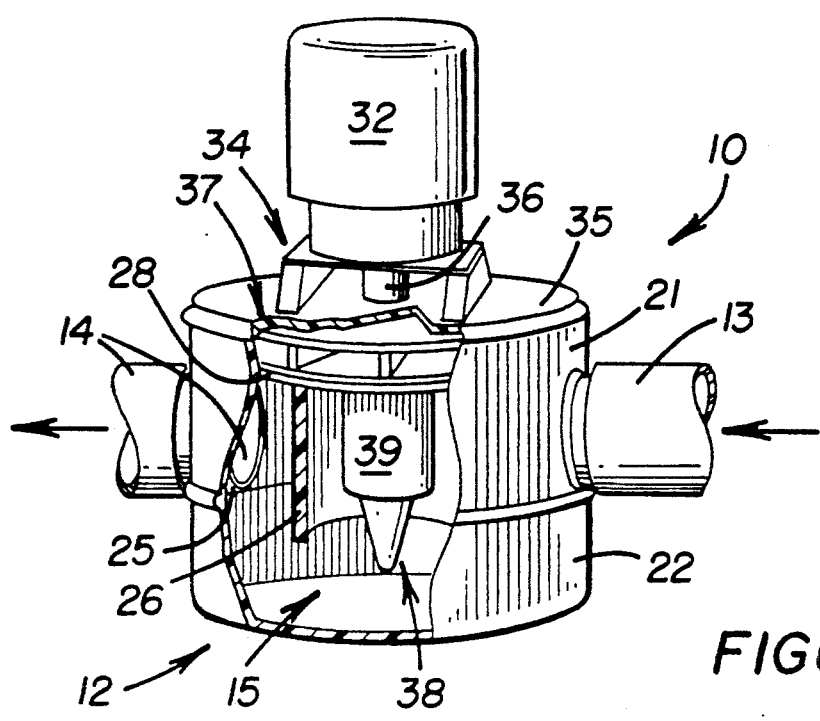
FIG. 2 is partially sectioned front isometric view of the apparatus.
Figure 3:
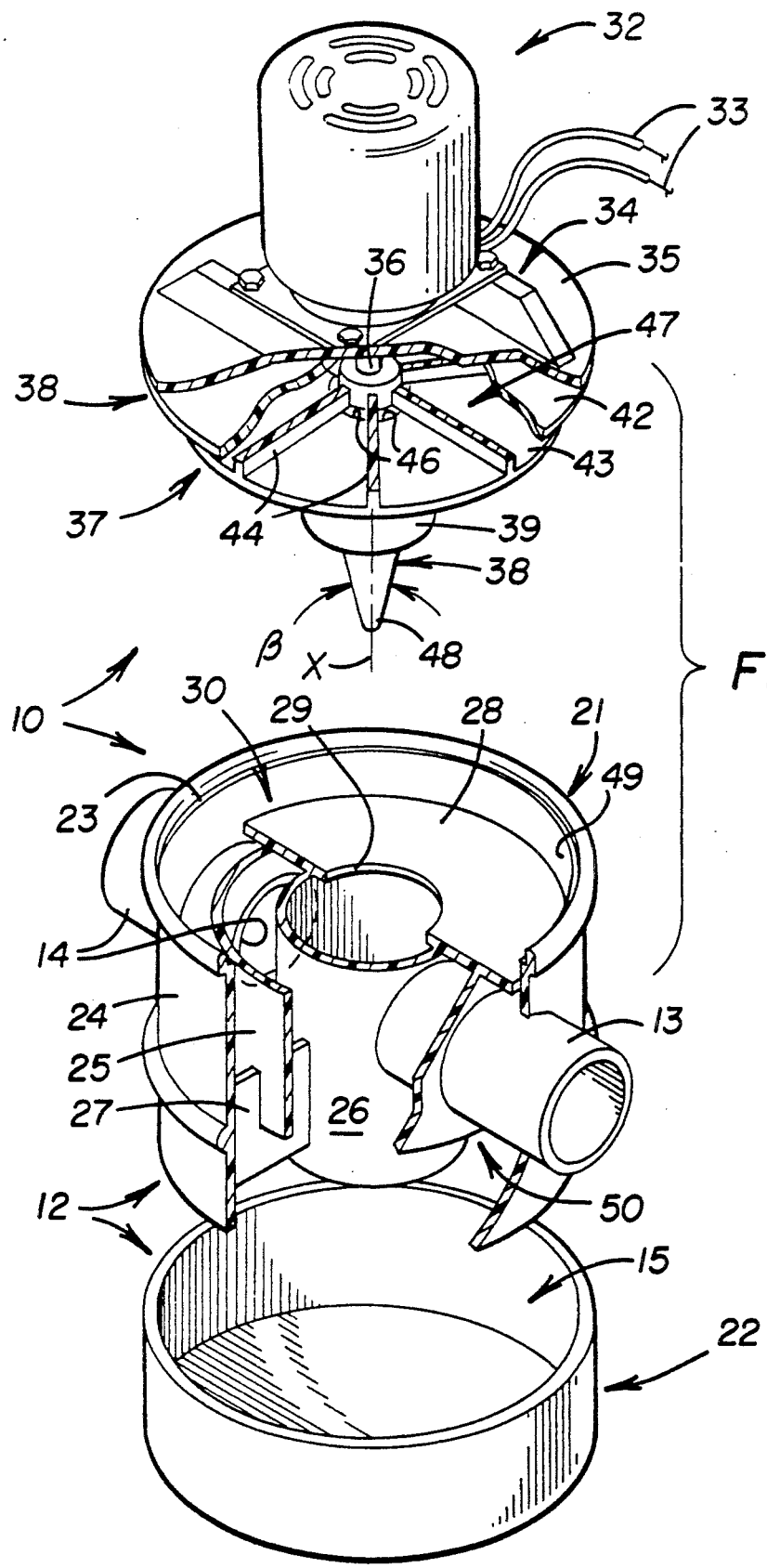
FIG. 3 is a partially sectioned isometric and exploded view illustrating component parts of the apparatus.
Figure 4:
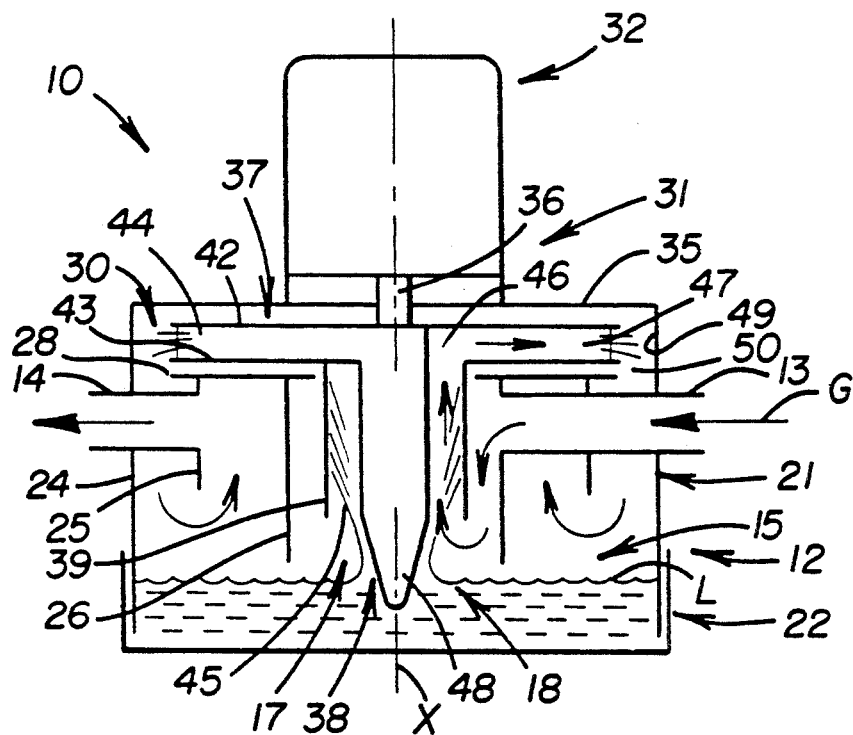
FIG. 4 schematically illustrates the apparatus and its functions.

Referring to FIGS. 2–4, housing 12 comprises an upper section 21 and a lower or base section 22 removably mounted on the lower end of the upper section. An annular shoulder or ledge 23 is defined within section 21 for purposes described hereinafter. Set screws or the like could be utilized to secure the housing sections together and to permit bowl-shaped section 22 to be periodically removed for the purpose of replacing the water retained in reservoir 15, defined therein. Upper housing section 21 comprises three concentric cylindrical sections 24, 25 and 26 secured together by the conduits constituting inlet 13 and outlet 14 and two or more circumferentially spaced and radially extending struts 27. (FIG. 3).

A horizontally disposed and disc-shaped partition 28 is secured on the upper ends of intermediate and inner cylindrical sections 25 and 26, as shown in FIGS. 3 and 4, and defines a centrally disposed opening 29 therethrough. An annular drain passage 30 is defined radially outwardly between the outer circular edge of partition 28, the outer cylindrical surface of intermediate section 25 and the inner cylindrical surface of outer section 24. Inlet conduit 13 extends through housing sections 24–26 to have its outlet end communicate within inner section 26. Outlet conduit 14 only extends through sections 24 and 25 and has its inlet end exposed to the annular chamber or passage defined between sections 25 and 26.

Referring briefly to FIG. 4 and as described more fully hereinafter, mixing and separation means 18 comprises a combined pickup, blower and scrubber means 31. When assembled (FIGS. 2 and 4) means 31 functions to: (1) draw air G over liquid L to break the surface tension thereof and to guide the air generally vertically upwardly through the working chamber from inlet 13; (2) engage and lift the liquid vertically to combine with the air to form an air-liquid mixture; and (3) centrifugally cast at least substantial quantities of the mixture against inner impingement surfaces defined internally on housing 12. Thus, pre-selected elements contained in the mixture can be efficiently separated therefrom and permitted to drain back into reservoir 15 under the influence of centrifugal force and gravity, as described below.

As shown in FIGS. 2 and 3, combined pickup, blower and scrubber means 31 comprises an electrical motor 32 adapted to be plugged into a standard 110 v. socket (not shown) via connected wires 33. The housing of the motor is suitably secured by brackets 34 on a disc-shaped cover plate 35. The cover plate is mounted on shoulder 23, defined on the upper end of cylindrical section 24 of the housing, and has annular elastomeric seal (not shown) mounted on its periphery to form a static seal thereat.

An output or drive shaft 36 of the motor, adapted for rotation about a vertically disposed axis X, has a blower assembly 37 secured thereon for rotation therewith. The distal end of the drive shaft has a rotor 38 secured thereon for simultaneous rotation with a cylindrical shroud 39. The upper end of the shroud is secured to the underside of blower assembly 37. Thus, activation of motor 32 will rotate the blower assembly, rotor 38 and shroud 39 simultaneously.

Rotor 38 comprises a pair of horizontally disposed and parallel disc-shaped plates 42,43. A plurality of circumferentially and equally spaced vanes 44 are secured between the plates to extend radially outwardly from a central rotational axis X of the rotor and blower assembly. Cover plate 35 has a slightly larger diameter than plates 42,43 and is suitably mounted on shoulder 23 to provide sufficient clearances between the suspended rotor of the blower assembly and the housing, including stationery partition 28, to permit the blower assembly to freely rotate in the housing.

As more clearly shown in FIG. 4, the working chamber, generally shown at 17, comprises a plurality of interconnected passages including a generally annular passage 45 defined between rotor 38 and shroud 39. Shroud 39 is closely fitted within opening 29 (FIG. 3) but is allowed to freely rotate relative to partition 28. Passage 45 terminates at its upper or distal end at circumferentially spaced passages 46, defined adjacent to and between the radially inner ends of vanes 44 (FIG. 3). Passages 46, in turn, communicate with radially outwardly directed and pie-shaped passages 47, defined between plates 42,43 and vanes 44.

An end 48 of rotor 38 is conically shaped to have its outer surfaces define an acute angle $\beta$. In general, as the size of the angle increases, the spray pattern will become larger. The specific angle chosen for a particular application will largely depend on the chemical make-up o liquid L, the material composing the outer pick-up surface of the rotor and the rotational speed thereof.

The end of the rotor extends into liquid L and functions as a pump to create a circular pattern of turbulence over the surface of the liquid. Rotation of blower assembly 37 and rotor 38 will function to create a differential pressure across working chamber 17 (from the inlet to passage 45 to the outlet of passage 47). The gas (air) stream will be drawn over the surface of liquid L to break its surface tension and will be guided generally vertically upwardly through passage 45.

In co-operation and with the aid of capillary action, the liquid will be lifted along the outer surface of rotor 38 and will be centrifugally cast radially outwardly in a spray pattern to combine with gas G to form a gas-liquid mixture. The mixture then proceeds upwardly through passages 45 and the initial mixing and scrubbing action will occur on the inner cylindrical surface of shroud 39 that rotates with rotor 38. The mixture then flows through passage 46 and is centrifugally cast by vane 44 radially outwardly through passages 47 to complete the mixing and scrubbing function.

The mixture will impinge against surfaces 49, formed internally on the housing to define the outer boundary of working chamber 17. At least substantial quantities of the mixture are centrifugally cast by vanes 44 against surfaces 49 whereby preselected elements contained in the mixture are separated therefrom. The separated elements are permitted to drain into reservoir 15 under the influence of centrifugal force and gravity, via an annular drain passage 50 defined between sections 24 and 25 of the housing to communicate with annular passage 30 (FIG. 3).

At the beginning of the scrubbing cycle, liquid L essentially functions to adhere to the rotor by capillary action with centrifugal forces cooperating with such action to permit the rotor to lift the liquid along its outer surfaces. The liquid will break loose from the rotor to form the centrifugally cast spray pattern when the forces imposed on the liquid are sufficient to overcome the adhesion forces holding the liquid to the rotor. In particular, the area surrounding the inlet to passage 45, adjacent to end 48 of the rotor, will exhibit a low pressure relative to the higher pressure prevalent in the area surrounding the outlets from passages 47, located adjacent to impingement surfaces 49.

FIG. 5 schematically illustrates a modified apparatus 110. The apparatus comprises a stationery housing 112 having an inlet 113 and an outlet 114. A reservoir 115 is defined in the housing to retain a liquid L therein. A rotor 138 and a shroud 139 are adapted to be rotated simultaneously by a motor 132, via the motor's output shaft 136.

Circumferentially spaced vanes 144 are formed between the main body of the rotor and shroud 139. In contrast to vanes 22 (FIG. 4), vanes 144 curve upwardly and radially outwardly from their proximal end adjacent to a conically shaped end 148 of the rotor and define flow passages 145. The distal or discharge ends of the blades are positioned opposite to impingement surfaces 149, adapted to receive the centrifically cast gas-liquid mixture thereon. An annular drain passage or chamber 150 functions to return the separated elements in wetted form back to reservoir 115.

In operation, gas G enters the apparatus via inlet 113 and is induced to flow into an annular low pressure inlet to passages 145. Rotation of the rotor blades will function to create a differential pressure across the passages, i.e., the lowest pressure being in the area surrounding the inlet to passage 145 and the relatively higher pressure being in the area surrounding the outlet from the passages. As above, rotation of a conically shaped end 148 of the rotor, at least partially emersed in liquid L, will function to pick up liquid by capillary action. The liquid will, by centrifugal force, move upwardly on the outer surfaces of the rotor and into the throat of the low pressure scrubbing zone beginning at the inlet to passages 145.

As further shown in FIG. 5, the angle of passage 145 and blades 149 gradually increases from the inlet to the outlet of passages 145, relative to rotational axis X. As this angle increases, centrifugal forces acting on the liquid will proportimately increase to break the liquid loose from the rotor and fling it into the gas stream. The pressure differential created across passages 145 will also aid in moving the mixture upwardly during the scrubbing function.

Vanes 144 provide the motive force to process the gas-liquid stream or mixture and eject the stream into the high pressure zone existing adjacent to the outlet from passages 145. The mixture is centrifugally cast by the vanes against stationery impingement surfaces 149 to complete the scrubbing action of the high pressure spray of gas and liquid in this high pressure area. The stripping action provided by the high speed gas stream is occasioned by its spinning around (similar to a tornado) in this area and against the wetted surfaces 149.

The gas-liquid mixture impinged on surfaces 149 will then drain back to reservoir 115 via drain passage 150. An overflow pipe 151 can be suitably mounted in reservoir 115 to tap off excess liquid L. Further, a liquid injector 152 can be mounted adjacent to gas inlet 113 to seed the gas with a chosen chemical in a conventional manner.

Figure 7:
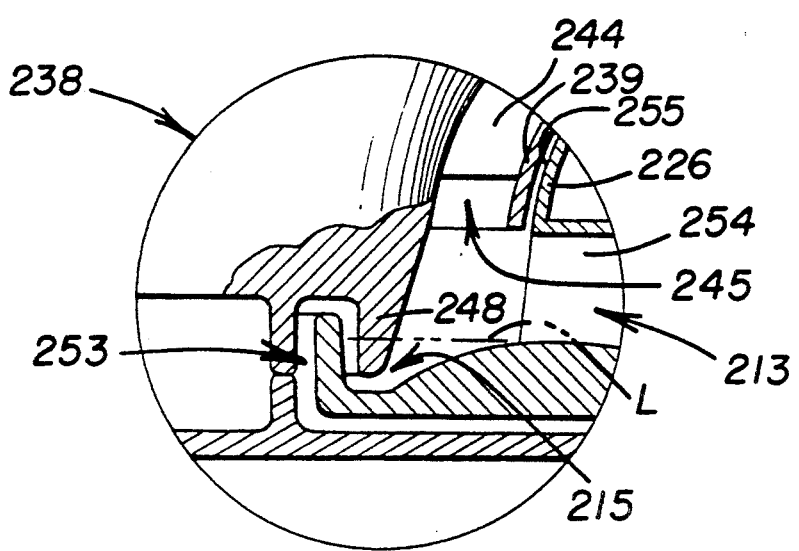
FIG. 7 is an enlarged sectional view, taken within circle VII in FIG. 6, more clearly showing portions of two connected stages of the apparatus.

FIGS. 6 and 7 illustrate dynamic gas-liquid contact apparatus embodiment 200 of this invention wherein modular sections 210 are connected together in a stacked series to provide a multi-stage dynamic gas-liquid contact apparatus. The contaminated gas stream entering an inlet 213 is progressively cleaned as it passes upwardly through the various stages and exits as a "clean" gas at an outlet 214. Each working stage or section 210 functions generally in the same manner as described above in reference to apparatus 110 in FIG. 5.

In particular, contaminated gas G enters the first or lowest stage at inlet 213 and is processed by a rotor 238 in the manner described above. The inlet is curved to set-up flow direction and a plurality of circumferentially spaced and stationary deflector vanes 253 are secured therein whereby initial stripping action occurs. Rotors 238 are each attached to a common drive shaft 236 of a motor 232. Vanes 244 of each rotor has a shroud 239 secured thereon to rotate therewith and to define flow passages 245 therethrough.

As shown in detail in FIG. 7, a standard annular gas-liquid seal 254 is provided to prevent the liquid to flow therepast, radially inwardly towards rotational axis X, from an annular reservoir 215 defined on a fixed component of housing 212. The gas entering inlet 213 will enter passage 245, along with liquid L. A frustoconically shaped end 248 of the rotor is emersed in the liquid to pick-up and draw the liquid along the outer surfaces of the rotor by capillary action and into the throat of the flow pressure scrubbing zone adjacent to the inlets to passages 245.

The mixture is then processed through passages 245 in the manner described above in reference to FIG. 5. As shown in FIG. 6, vanes 244 of the rotor will impel the mixture against wetted stationary impingement surfaces 249 to complete the first stage of the mixing, scrubbing and separation functions. The mixture then proceeds upwardly through the second stage to repeat the process.

The number of stages utilized can vary, depending upon the particular application and requirements. Circumferentially spaced and stationary deflector 253 of the second stage will complete the activity by slowing the gas stream down and by demisting the mixture. A bypass passage 255 is defined between a housing partition 226 and shroud 239 to drain liquid back into the gas stream or into a respective reservoir 215. As further shown in FIG. 7, each reservoir is defined by annular portions of components of housing 212.

The clean gases will exit the apparatus via outlet 214. An inlet 252 can be utilized to inject fresh liquid or additives into the high pressure scrubbing ring and into bypass passages 255. An overflow and drain outlet 251 is provided for purposes described above.

FIGS. 8-12 illustrate a horizontally disposed and multi-stage dynamic gas-liquid contact apparatus embodiment 300 of this invention. The apparatus is also designed to initially create an intimate contact between a gas G, such as air, and a liquid L, such as water. The apparatus further functions to drive contaminants and/or heavy particles, or other elements suspended in the gas, into the liquid and hold such elements under the surface tension of the liquid. Sufficient time is thus provided to achieve a pre-determined gas-liquid chemical reaction, dependent on the particular chemical make-up of the gas and liquid utilized in the system.

In summary, a gas stream G entering an inlet 313 is forced over a liquid L, contained in a reservoir 315. A liquid-gas mixture is formed and is induce to reverse flow through a series of inter-communicating working chambers 317 and 350 by a series of rotors or blowers 338. The mixture passes through a final demisting section 310' before being exhausted from the apparatus via an outlet 314.

The action of the gas when it passes over the surface of the liquid is similar to that occasioned when a wind current tears droplets of water from ocean waves. One of the principles of operation takes advantage of the phenomena that objects in motion tend to stay in motion in relation to their mass. Thus, heavier particles in the gas-liquid mixture will travel in a more direct fashion than the gas proper and will impinge against wetted surfaces 349 of walls 325,326 while the gas stream is forced to change direction in the apparatus.

The labyrinth gas flow through the apparatus provides multiple inverted flow paths (the number being dependant on the number of stages or sections 310 required for a particular application) to accumulate the heavier particles against surfaces 349. The labyrinth flow also serves to extend residence or retention time for the gas and liquid to contact each other. Fresh liquid can be introduced into the next to last stage of the apparatus at a spray nozzle 352 to provide a final cleansing action to the gas before the gas enters demisting station 310'. The liquid with the highest level of contamination can be recirculated back to the first section via a spray nozzle 352' to provide a maximum amount of contact and maximum use of the liquid before removing or draining the liquid from the apparatus for waste treatment or use as an end product.

In detail, as gas stream G is drawn into a common scrubber housing 312 through inlet 313, it is sprayed with recirculated liquid from spray nozzle 352. The gas-liquid mixture is deflected against the outer side of a partition wall 325 and proceeds downwardly through a liquid bath contained in reservoir 315 that is maintained at predetermined level in all working sections of the apparatus via interconnecting passages 315', defined between the lower ends of directors 358 and the floor of housing 312. The liquid is allowed to move from the cleanest leftwardmost end section in FIG. 8 to the most contaminated or forward-most section, adjacent to inlet 313, under inducement of the pressure differential maintained throughout the system, as depicted by the pressure profile in FIG. 9. The pressure is substantially constant within a vertical plane in each section.

The gas flow in the apparatus is regulated by a self-adjusting air flow control 356 (FIGS. 8 and 11) that self-regulates an opening 357 between the liquid bath and each partition wall 325. The gas flow is drawn at a high velocity over the liquid bath and into the first stage relatively low pressure working chamber 317 to cause the surface of the liquid to be torn and drawn into the gas stream in droplet form and directed upwardly by a concave director 358, extending transversely fully across the floor of housing 312 (FIG. 10).

Figure 11:
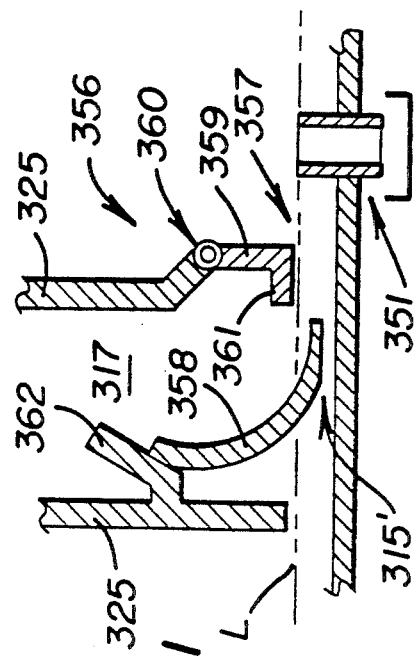
FIG. 11 is an enlarged sectional view, taken within circle XI in FIG. 9.

As shown in FIG. 11, air flow control 356 is in the form of a flapper valve having a plate 359 pivoted at 360 on a lower end of wall 325. Plate 359 also extends fully across working chamber 317 (FIG. 10). A guide extension 361 may be secured on the lower end of plate 359 to face director 358 whereby the entering gas stream will be efficiently guided onto the director when plate 359 pivots clockwise in FIG. 11 to automatically regulate the size of opening 357.

The gas-liquid mixture, after leaving director 358, will strike a deflector 362 that is positioned to deflect the mixture towards the opposed inner surface of wall 325. In addition, the gas stream passing through opening 357, the size of which is automatically regulated by the pressure differential occurring on either side thereof, will strike the liquid stream being thrown off deflector 362 in an oblique manner. The gas stream will impel a portion of the liquid droplets against inner surface 349 of wall 325.

Referring to FIG. 8, sufficient gas velocity and volume is required in working chamber 317 to create a maximum amount of turbulence and movement of the liquid droplets against the inner surface wall 325. At the same time, the liquid is allowed to flow downwardly along the impingement surface and to fall back into reservoir 315 and into the "quiet" area on the downstream side of director 358. Sufficient clearances are provided around the director for this purpose.

The gas-liquid mixture is then drawn by a leading blower assembly 337, through an inlet 346 and into vortices created at the upstream side of the blower assembly. The mixture enters the confines of a leading rotor 338 by passing through a plurality of circumferentially spaced inlet ports 363 (FIG. 10). As shown in FIGS. 8 and 10, each rotor 338 is in the form of a turbine wheel mounted for rotation on a motor driven output shaft 336.

Each rotor comprises a pair of axially spaced plates 342,343 having a star-shaped member secured therebetween to define a plurality of radially extending and circumferentially spaced vanes 344. Inlet ports 363 are formed through plate 343. The mixture thus flows through opening 346 and ports 363 and into the pie-shaped spaces defined between the plates and vanes.

This drawing effect is created by the rotational and centrifugal action of the blower assembly which functions to throw the mixture out across the outer lips defined on vanes 344. The gas flow tends to move to the backside of rotor 338 and the liquid is distributed evenly across the vanes to again provide a "tearing" action of the gas stream crossing the liquid stream. The liquid is thrown against the impingement surfaces 349 of this scrubbing section to centrifugally demist the gas stream and impinge the liquid and heavier particles onto the surfaces.

The wetted particles or elements are free to drain back into reservoir 315 under the influence of centrifugal force and gravity. The gas stream is forced downwardly through the next adjacent relatively high pressure (FIG. 9) demisting chamber 350 by being both pushed and pulled through the next adjacent controlled opening 357 (FIGS. 8 and 11). The next stage of the scrubbing cycle is initiated in the manner described above and the processed gas exits the apparatus through a standard demisting medium 364 and outlet 314.

Although gas flow controls 356 are shown as being self-adjusting to automatically control the size of a respective opening 357, it should be understood that they could be fixed to provide a set opening. Alternatively, plate 359 could be adjusted in guillotine fashion to control the size of the opening by mechanically manipulating control means (not shown), mounted exteriorly of the apparatus. The particular type of air flow control utilized is primarily determined by the quantity of the gas stream desired for reaction with the liquid, i.e, $Q=AV$. Liquid L can be maintained at a desired level in reservoir 315 by a standard adjustable drain or overflow 351 (FIG. 11).

Motor 332 provides the primary motive force for driving rotors 338. The rotors can be directly driven by shaft 336 in the manner illustrated in FIG. 8 or indirectly driven through a standard gear assembly or belt drive assembly, as is well-known to those skilled in the art. It should be understood that other types of rotors or blower wheels 338 could be utilized. However, experimentation has shown that the design illustrated in FIGS. 8 and 10, using a highly chemical resistant polypropylene material for its composition, facilitates fabrication and functions efficiently.

Rotating vortices, created by the rotors adjacent to inlet ports 363, tend to control the inlet flow without any appreciable gas being drawn around the face of the rotors. The rotors and chambers 317 and 350 are preferably uniformly sized to create the maximum controlled amount of pressure drops and increases, as well as flow direction changes, to provide the liquid sufficient time to accumulate "quiet time" and also allow the gas stream the necessary residence time to achieve the desired scrubbing results. Housing 312 can be made in the form of a box and is preferable composed of a chemical resistant material, such as polypropylene or the like, that is predetermined by the corrosiveness and related chemical properties of the gas and liquid processed by the apparatus.

The next to last stage of the apparatus could be used only as a demisting section, rather than a scrubbing section, by fully opening plate 359 and opening 357 and by removing its adjacent director 358. This modification would allow additional residence time and provide a higher positive pressure to drive the gas stream through demisting medium 364 and into outlet 312.

Each rotor 338 is preferably of the centrifugal type and suitably configured to provide the maximum amount of liquid to gas contact. The rotors should create the maximum amount of wetted surface to provide the greatest chemical reaction time while yet keeping the surfaces of the rotor cleaned of accumulated contaminants. The preferred design, as shown in FIGS. 8 and 10, comprises four circumferentially spaced ports 363 formed through plate 343. Each port preferably has a radius substantially equalling the distance between the rotor's rotational axis X and the center of a respective opening. The size of the ports must be sufficient to conduct the predetermined quantity of air flow therethrough, at a given rotational speed of shaft 336. The size of opening 346 is preferably slightly smaller than the outer perimeter of the four ports to create a "mask" over outer portions of the ports, as shown in FIG. 10.

The width of each rotor should be sufficient to substantially fill the scrub chamber cavity in which it is mounted (between walls 325,236), but sufficiently narrow to keep all rotor adjacent wall surfaces wetted. The rotor should function to at least substantially uniformly centrifugally cast liquid from rotor vanes 344 while simultaneously impelling the gas stream essentially from the back or downstream area of the rotor. Drive shaft 336 is also preferably composed of a corrosion resistant material and may be sheathed with additional corrosion resistant material, such as polypropylene, to prevent deterioration.

Housing 312 may be split in a horizontal plane, approximately at the level of shaft 336, to allow the upper section of the housing to be removed. Thus, access to the rotors, drive shaft and attendant components will be made readily accessible for installation and maintenance purposes. Rotors 338 can be fabricated from laminated layers of chemically resistant polypropylene, molded cast, or fabricated by other conventional methods well-known to those skilled in the art.

The suction curve of FIG. 9 depicts the relative pressure drops and rises occurring in each successive scrubbing section 310. This pressure profile can be varied by the particular design of rotors 338, the level of liquid L in reservoir 315, the inlet flow control of gas G and variance in the size of controlled opening 357 (FIGS. and 11). Since scrubbing effectiveness is directly related to the energy and activity occurring in the scrubber chambers, the relative pressure drops and rises can be designed to provide optimum scrubbing efficiencies, while yet providing minimum energy input to the apparatus and system.

Apparatus 300, having a rotor or blower wheel in each successive section, provides a higher scrubbing efficiency and requires only approximately one-tenth the horsepower requirements demanded by conventional systems of similar size and capacity. The use of the blower wheels as an agitation and demisting means for removing additional contaminants from the gas stream as it passes through the scrubber, has proven to be a highly efficient and effective use of motive energy.

Figure 12:
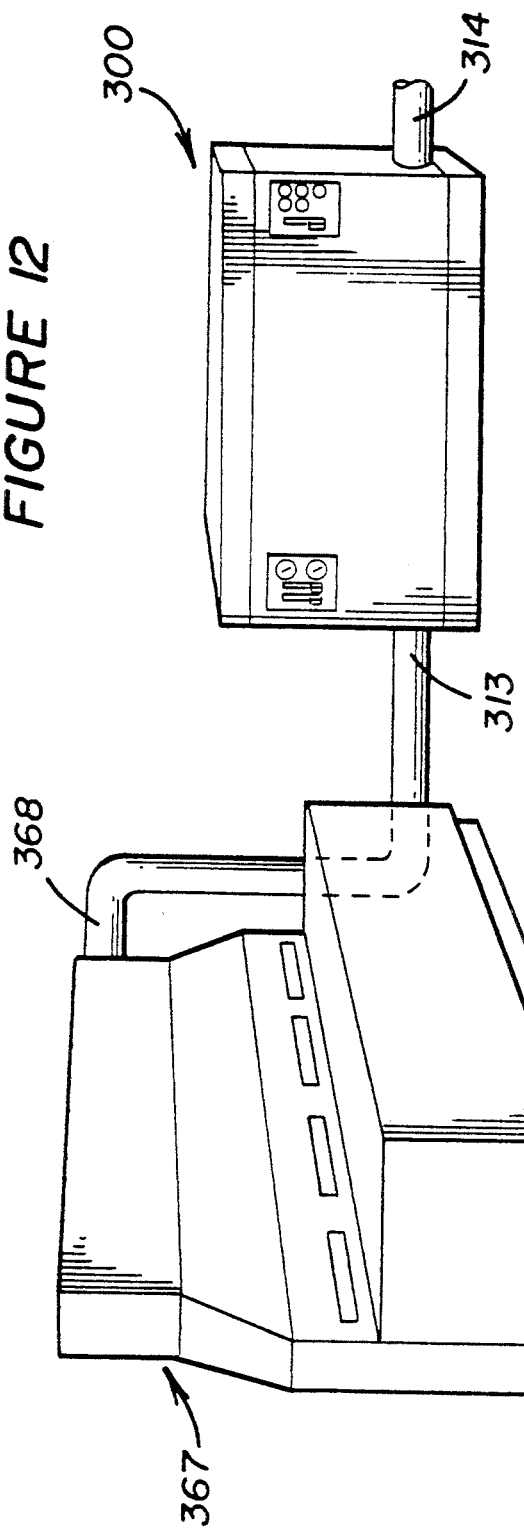
FIG. 12 illustrates a typical industrial application for the type of apparatus illustrated in FIGS. 8 and 10.

FIG. 12 illustrates an industrial application of apparatus 300, such as for use with a silicon etch and polish station, a cleaning operation, a precious metal reclaiming operation, printed circuit board manufacture or a wet station, i.e., wafer fabrication. As shown, an industrial system 366 is covered by a hood 367. The hood functions to collect contaminated gases and to communicate them to dynamic gas-liquid contact apparatus 300 via a conduit 368 and inlet 313 to the apparatus.

A specific example of apparatus 300 is one having three scrubber sections 310 and an overall vertical height of 30", a width of 24" and a length of 48". Rotors 338 each have a diameter of 16" and a width of 3.5". Electric motor 332 would be rated at two horsepower and function to scrub from 400 to 900 SCFM of air with the optimum being 750 SCFM of air. Liquid L would constitute a water bath.

I claim:

1. A dynamic gas-liquid contact apparatus for separating pre-selected elements in wetted form from a gas-liquid mixture comprising:
   a stationary housing defining a working chamber therein having an inlet and an outlet,
   reservoir means positioned at a lower end of said chamber for retaining a liquid therein, and mixing and separation means mounted in said chamber for (1) drawing a gas into said chamber from said inlet by inducing a differential pressure across said chamber between the inlet and outlet thereof, (2) moving said gas over the surface of said liquid to break the surface tension thereof and to simultaneously form a gas-liquid mixture, and (3) scrubbing and separating said preselected elements in wetted form from said mixture, including combined blower and scrubber means rotatably mounted in said housing for inducing said differential pressure across said working chamber and for simultaneously receiving and scrubbing a substantial portion of said mixture.

2. The dynamic gas-liquid contact apparatus of claim 1 wherein said mixing and separation means includes means for receiving and draining said pre-selected elements to said reservoir means in wetted form under the influence of centrifugal force induced by said combined blower and scrubber means and gravity.

3. The dynamic gas-liquid contact apparatus of claim 1 wherein said combined blower and scrubber means includes means for centrifugally stripping, casting and impinging at least substantial quantities of said mixture in wetted form and at a high impact velocity against a stationary surface defining an outer boundary of said working chamber.

4. The dynamic gas-liquid contact apparatus of claim 1 wherein said apparatus is vertically disposed and is centered on a vertically disposed axis, said housing having impingement surfaces defined therein to surround said axis and to define an outer boundary of said working chamber, and said mixing and separation means comprising liquid pickup, blower and scrubber means mounted in said housing for rotation about said axis and defining an inner boundary of said working chamber for (1) drawing a gas over said liquid to break the surface tension thereof and for guiding said gas generally vertically upwardly though said working chamber for transmission from said inlet to said outlet, (2) engaging and lifting said liquid vertically to combine said liquid with said gas to form a gas-liquid mixture, and (3) scrubbing and centrifugally casting at least substantial quantities of said mixture against said impingement surfaces whereby preselected elements contained in said mixture are separated therefrom.

5. The dynamic gas-liquid contact apparatus of claim 4 wherein said liquid pickup, blower and scrubber means comprises rotor means defining outer pickup surfaces terminating at a distal end of said rotor means, extending into said liquid, for lifting said liquid upwardly from said reservoir means and along said pickup surfaces with the aid of capillary action and for centrifugally casting said liquid radially outwardly therefrom in a spray pattern to combine with said gas to form said mixture.

6. The dynamic gas-liquid contact apparatus of claim 5 wherein the distal end of said rotor means is at least partially conically-shaped to create a circular pattern of turbulence over the surface of said liquid.

7. The dynamic gas-liquid contact apparatus of claim 6 wherein said rotor means comprises shroud means at least partially surrounding the outer pickup surfaces of said rotor means for receiving said spray pattern and for initiating a scrubbing action on said mixture.

8. The dynamic gas-liquid contact apparatus of claim 7 wherein the outer surfaces of the distal and conically shaped end of said rotor means defines an acute angle.

9. The dynamic gas-liquid contact apparatus of claim 7 wherein said pickup, blower and scrubber means comprises rotatable blower means for creating a differential pressure across said working chamber.

10. The dynamic gas-liquid contact apparatus of claim 9 wherein said blower means comprises a plurality of circumferentially spaced and radially outwardly extending vanes secured on said rotor means for rotation therewith.

11. The dynamic gas-liquid contact apparatus of claim 10 wherein said vanes are at least generally straight and define pie-shaped flow passages therebetween.

12. The dynamic gas-liquid contact apparatus of claim 10 wherein said vanes curve upwardly and radially outwardly from proximal ends, adjacent to the distal end of said rotor means, and terminate at distal ends thereof positioned opposite to said impingement surfaces 13. The dynamic gas-liquid contact apparatus of claim 10 further comprising drain passage means defined in said housing for communicating liquid contacting said impingement surfaces to said reservoir means to return said separated pre-selected elements to said reservoir means.

14. The dynamic gas-liquid contact apparatus of claim 13 wherein said rotor means comprises a single rotor and said housing comprises an upper section and a lower section removably mounted on a lower end of said upper section, said reservoir means defined in said lower section.

15. The dynamic gas-liquid contact apparatus of claim 14 wherein said upper section comprises concentric and cylindrical outer inner and intermediate sections secured together to define said drain passage means between said outer and intermediate sections, an inlet passage communicating with said inlet within said inner section and an outlet passage communicating with s id outlet between said inner and intermediate sections.

16. The dynamic gas-liquid contact apparatus of claim 15 wherein said upper section further comprises a horizontally disposed partition secured on upper ends of said inner and intermediate sections and spaced radially inwardly from said outer section to define a passage of said drain passage means therebetween.

17. The dynamic gas-liquid contact apparatus of claim 16 wherein said rotor means is mounted for rotation on said partition.

18. The dynamic gas-liquid contact apparatus of claim 12 wherein a plurality of said apparatus are connected together in stacked series to provide a multistage dynamic gas-liquid contact system and wherein the outlet of a first apparatus communicates with the inlet to a next adjacent second apparatus connected thereabove.

19. The dynamic gas-liquid contact apparatus of claim 18 further comprising stationary deflector vane means in each said inlet for initiating a stripping action for separating said pre-selected elements from said mixture.

20. The dynamic gas-liquid contact apparatus of claim 19 further comprising gas-liquid seal means for preventing flow of said liquid radially inwardly towards said axis from said working chamber.

21. The dynamic gas-liquid contact apparatus of claim 1 further comprising means for injecting said liquid and/or additives into said working chamber.

22. The dynamic gas-liquid contact apparatus of claim 1 wherein said apparatus is horizontally disposed and said mixing and separation means comprises baffle means mounted in said chamber for sequentially guiding and deflecting (1) said gas in the direction of a first path moving over the surface of said liquid, (2) said mixture in the direction of a second path moving generally vertically upwardly from said reservoir, and (3) said mixture in the direction of a third path moving generally vertically downwardly toward said reservoir in general parallel relationship relative to said second path, and combined blower and scrubber means rotatably mounted in said chamber about a horizontally disposed axis and positioned at a transition from said second path to said third path for drawing said gas from said inlet and along said first path, sequentially pumping said mixture along said second and third paths and cooperating with said baffle means for scrubbing and at least substantially removing said elements from said mixture.

23. The dynamic gas-liquid contact apparatus of claim 22 wherein a plurality of said apparatus are mounted in said housing and communicate with each other in series to provide a multi-stage dynamic gas-liquid contact system and wherein the outlet of a first apparatus communicates with the inlet to a next adjacent second apparatus disposed in side-to-side relationship therewith.

24. The dynamic gas-liquid contact apparatus of claim 23 further comprising means for spraying said liquid and/or additives into said gas before said gas enters the inlet to the working chamber of said first apparatus.

25. The dynamic gas-liquid contact apparatus of claim 24 wherein said baffle means sequentially comprises three vertically disposed and longitudinally spaced first, second and third partition walls defining said working chamber therebetween.

26. The dynamic gas-liquid contact apparatus of claim 25 further comprising gas flow control means defining an opening of predetermined size between a lower end of said first partition wall and said liquid for directing said gas over the surface of said liquid.

27. The dynamic gas-liquid contact apparatus of claim 26 wherein said gas flow control means comprises self-adjusting flapper valve means for automatically varying the size of said opening in response to a pressure differential occurring on opposite sides thereof.

28. The dynamic gas-liquid contact apparatus of claim 26 wherein said baffle means further comprises director and deflector mean receiving said mixture from said opening and for directing said mixture against said first partition wall.

29. The dynamic gas-liquid contact apparatus of claim 28 wherein said combined blower and scrubber means comprises a rotor having a pair of axially space plates and a plurality of circumferentially spaced and radially outwardly extending vanes secured between said plates.

30. The dynamic gas-liquid contact apparatus of claim 29 wherein the rotor of each apparatus is mounted on a common shaft.

31. The dynamic gas-liquid contact apparatus of claim 29 wherein said second partition wall has an opening formed therethrough and each said plate has a plurality of circumferentially spaced ports formed therethrough, each having a radius at least substantially equal to the distance between said axis and a center of said opening.

32. A method for dynamically separating preselected elements in wetted form from a gas-liquid mixture comprising the steps of maintaining the surface of a liquid, containing predetermined first elements, at a preselected level in a reservoir, sequentially passing a gas, containing predetermined second elements, from an inlet, over the surface of said liquid to break the surface tension thereof and to simultaneously form a gas-liquid mixture, and to an outlet by inducing a differential pressure between said inlet and outlet in response to rotation of a rotor, and scrubbing and separating preselected ones of said first and second elements in wetted form from said mixture, including passing said mixture through said rotor to effect a substantial portion of said scrubbing therewith.

33. The method of claim 32 further comprising the step of receiving and draining said preselected ones of said first and second elements to said reservoir in wetted form under the influence of centrifugal force induced by said rotor and gravity.

34. The dynamic gas-liquid contact apparatus of claim 32 wherein said scrubbing and separating step includes centrifugally stripping, casting and impinging at least substantial quantities of said mixture in wetted form and at a high impact velocity against a scrubbing surface.

35. The method of claim 34 wherein said scrubbing and separating step comprises moving said liquid and said gas at least generally vertically upwardly.

36. The method of claim 35 wherein said moving step comprises engaging and moving said liquid upwardly by a rotating rotor and with the aid of capillary action.

37. The method of claim 36 wherein said scrubbing and separating step comprises at least partially enclosing said rotor with a shroud, rotating said rotor and shroud together and centrifugally spraying said liquid from said rotor onto inner surfaces of said shroud.

38. The method of claim 37 wherein said scrubbing and separating step comprises creating said differential pressure at opposite ends of said rotor and shroud.

39. The method of claim 32 further comprising repeating said passing and scrubbing and separating steps.

40. The method of claim 39 wherein said steps are repeated in a general vertical, upward direction.

41. The method of claim 40 wherein said steps are repeated in a general horizontal direction.

* * * * *